United States Patent [19]

Walker

[11] 4,191,211

[45] Mar. 4, 1980

[54] VALVE MEMBER FOR A NON-RETURN VALVE

[75] Inventor: Robert M. Walker, Barrow-on-Soar, England

[73] Assignee: The British Steam Specialties Limited, England

[21] Appl. No.: 942,491

[22] Filed: Sep. 15, 1978

[51] Int. Cl.² ............................................ F16K 15/14
[52] U.S. Cl. ................................. 137/512.15; 137/854
[58] Field of Search ................. 137/512.15, 512.4, 854

[56] References Cited

U.S. PATENT DOCUMENTS

| 3,324,877 | 6/1967 | Bochan | 137/512.15 |
| 3,448,766 | 6/1969 | Schule | 137/854 |
| 3,473,561 | 10/1969 | Svenson et al. | 137/854 |

FOREIGN PATENT DOCUMENTS 1357249  6/1974  United Kingdom ................ 137/512.15
1519540  8/1978  United Kingdom ................ 137/512.15

Primary Examiner—William R. Cline
Attorney, Agent, or Firm—Burmeister, York, Palmatier, Hamby & Jones

[57] ABSTRACT

A non-return valve, comprising a perforate, hollow, conoidally-shaped valve seat defining a cavity of circular cross-section, a hollow, conoidally-shaped diaphragm of elastomerically deformable material and means for securing the diaphragm within the valve seat, so that the entire outer periphery of the rim of the diaphragm is in sealing engagement with the inner periphery of the rim of the valve seat, the diaphragm having an undeformed shape, prior to insertion of the valve member into the valve seat, such that the cross-section of the diaphragm, at least throughout a part of its axial length excluding the rim, is non-annular and bounded by non-circular inner and outer peripheries.

11 Claims, 8 Drawing Figures

VALVE MEMBER FOR A NON-RETURN VALVE

BACKGROUND OF THE INVENTION

The invention relates to a non-return valve in which a hollow, conoidally-shaped diaphragm of elastomerically deformable material is seated in a perforate, hollow, conoidally-shaped valve seat.

In a non-return valve such as this, the diaphragm is inwardly deformable when the pressure differential across the valve reaches a predetermined value, so as to allow fluid to pass through the valve seat. When the pressure differential falls below this predetermined value, the diaphragm resumes its underformed shape so as to seal against the valve seat and thereby prevent return flow.

In practice, the rim of such a diaphragm does not deform uniformly around its periphery, it deforms so that at least one portion of the outer surface of the diaphragm extending from the rim forms an outwardly concave surface. This irregular deformation of the valve member can result in a slow response to a reversal of pressure gradient and so various attempts have been made in order to ensure that the valve member will deform in a regular and predictable manner.

PRIOR ART

Thus, in British Pat. No. 1 048 335, a non-return valve has been proposed in which a valve member having a hollow, conically-shaped diaphragm is mounted within a hollow valve seat which is provided with at least one ring of unequally spaced apart apertures which allow streams of fluid having different rates of flow to impinge on circumferentially spaced portions of the outer surface of the diaphragm so as to ensure that these portions are inwardly deflected. In a similar form of non-return valve, disclosed in British Pat. No. 1 357 249, the hollow, conically-shaped diaphragm of a valve member has zones of different stiffness or zones rigidly secured to a hollow valve seat so that the less stiff or unsecured zones of the diaphragm are able to deform inwardly in a predetermined manner.

Although both of these techniques provide improved performance of the non-return valve, in the form of rapid response to a reversal of the pressure gradient, it is an object of the present invention to provide a non-return valve in which the valve member is more effectively pre-disposed to deform in a predictable and regular manner and so that the deflection of the rim of the diaphragm takes place in a plurality of places and it is not necessary for any part of the rim of the diaphragm to be so far displaced from the rim of the valve seat as to unduly lengthen the response time to a reversal in pressure gradient across the valve.

SUMMARY OF THE INVENTION

According to the invention, there is provided a non-return valve, comprising a perforate, hollow, conoidally-shaped valve seat defining a cavity of circular cross-section, a hollow conoidally-shaped diaphragm of elastomerically deformable material, and means for securing the diaphragm within the valve seat, so that the entire outer periphery of the rim of the diaphragm is in sealing engagement with the inner periphery of the rim of the valve seat, the diaphragm having an undeformed shape, prior to insertion of the valve member into the valve seat, such that the cross-section of the diaphragm, at least throughout a part of its axial length excluding the rim, is non-annular and bounded by non-circular inner and outer peripheries.

To ensure rapid return of the rim of the diaphragm into sealing engagement with the inner periphery of the rim of the valve seat, on reversal of the pressure gradient across the valve, the rim of the diaphragm is preferably formed with an inwardly directed bead which stiffens the rim of the diaphragm.

A valve member having a hollow, conoidally-shaped diaphragm moulded in the required shape can be inserted into the valve seat and then secured to the base of the valve seat by the diaphragm securing means so as to hold the entire outer periphery of the rim and, optionally, a part of the diaphragm at or adjacent the rim of the diaphragm, in sealing engagement with the inner periphery of the rim of the valve seat. At least part of the remainder of the outer surface of the diaphragm is spaced inwardly of the concavity defined by the valve seat to facilitate fluid flow through the valve seat after initial deformation of the diaphragm.

According to one embodiment of the invention, each non-annular cross-section of the hollow, conoidally-shaped diaphragm has a plurality of peripherally spaced outwardly-convex curved portions and interconnecting portions of different curvature to the outwardly-convex curved portions. Thus, if these interconnecting portions have a smaller curvature than the peripherally spaced outwardly-convex curved portions, the diaphragm will deflect inwardly more readily at these interconnecting portions. It is therefore possible to provide a valve member in which the hollow conoidally-shaped diaphragm has non-annular cross-sections of substantially polygonal shape in which the interconnecting portions have zero curvature with rectilinearly extending inner and outer edges. With this form of construction, the hollow conoidally-shaped diaphragm may be on non-annular cross-section throughout its entire length. In this case, the rim and any part of the diaphragm, at or adjacent the rim of the diaphragm sealingly engageable with the inner periphery of the rim of the valve seat, has a cross-section which, prior to insertion of the valve member into the valve seat, has outwardly-convex curved portions with radii which are greater than the radius of the inner periphery of the rim of the valve seat. Thus, as the valve member is pressed into the valve seat, the outwardly-convex curved portions of the non-annular cross-sections of the diaphragm, at least at and adjacent the rim of the diaphragm, are deflected inwardly by contact with the concavity defined by the valve seat so as to press the interconnecting portions of at least some of these cross-sections into engagement with the concavity. Because of the greater pre-stressing of those parts of the diaphragm forming the cross-section portions which were formerly outwardly-convex, the diaphragm will always deflect at those parts of the diaphragm forming the interconnecting portions of the cross-sections of the diaphragm.

In an alternative form of construction, in which a part of the hollow, conoidally-shaped diaphragm extending axially from the rim has an annular cross-section bounded by circular inner and outer peripheries, the interconnecting portions of each non-annular cross-section may constitute outwardly-concave curved portions. In this case, fluid flowing through the perforate valve seat is able to deform the diaphragm so that the rim of the hollow, conoidally-shaped member deflect, into outwardly-concave curved portions which form extensions of the outwardly-concave curved portions preformed in the diaphragm.

BRIEF DESCRIPTION OF THE DRAWINGS

A non-return valve according to the present invention and two different forms of the valve member are hereinafter described, by way of example, with reference to the accompanying drawings, in which.

DESCRIPTION OF THE PREFERRED EMBODIMENTS

Figure 1:
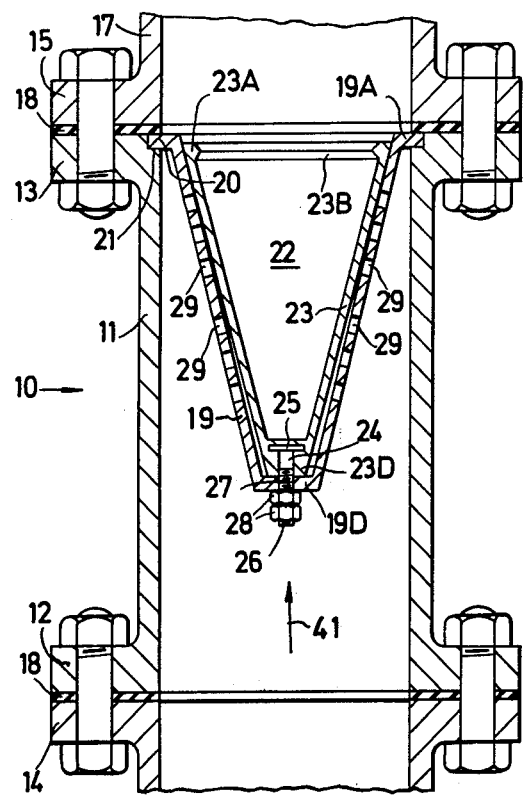
FIG. 1 is a sectional side elevation of a non-return valve, according to the invention, connected between supply and discharge pipes.

As shown in FIG. 1, the non-return valve 10 has a tubular housing 11 having flanges 12 and 13 at its inlet and outlet ends. These flanged ends are connected, respectively, to flanges 14 and 15 of inlet and discharge pipes 16 and 17 of a water supply by means of nuts and bolts which clamp sealing gaskets 18 between adjacent pairs of flanges.

A hollow, conoidally-shaped stainless steel valve seat 19 is formed with an outwardly directed flange 20 at its rim 19A. This flange 20 seats in a groove 21 formed at the outlet end of the housing 11 so as to be clamped in position by the flange 15 and the sealing gasket 18.

The valve seat 19 co-operates with a valve member 22 having, in its undeformed state, a hollow, conoidally-shaped rubber diaphragm 23 which is inserted within the valve seat 19 so that the entire outer periphery of the rim 23A of the diaphragm 23 is in sealing engagement with the inner periphery of the rim 19A of the valve seat 19. As shown, other parts of the outer surface 23B of the diaphragm 23 are inwardly spaced from the inner surface 19B of the valve seat 19. An inwardly directed bead 23C is formed at the rim 23A of the diaphragm 23 to prevent "fluttering" vibration of this rim when the diaphragm is deflected as a result of water flow through the valve 10 in the direction of the arrow 41 shown in FIG. 1.

A spindle 24 having a head 25 and a screw-threaded outer end 26 is embedded in the base 23D of the diaphragm 23 and is received in an aperture 27 formed in the base 19D of the valve seat 19 at the apex of its conical shape. Nuts 28 engaging the screw-threaded outer end 26 of the spindle 24 thus hold the diaphragm 23 in position.

Figure 2:
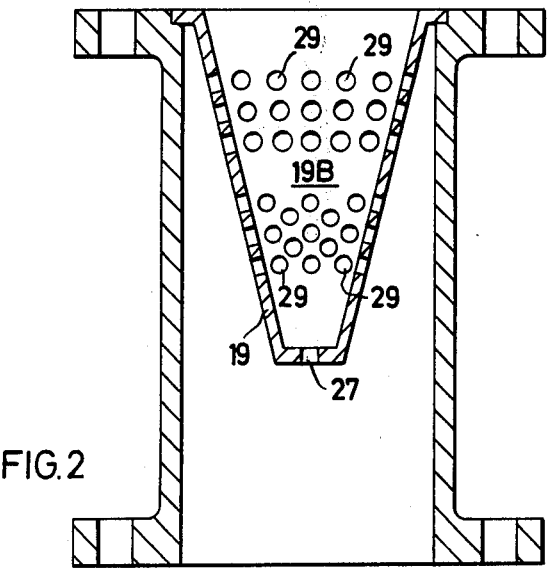
FIG. 2 is a sectional elevation of the apparatus shown in FIG. 1, but with the valve member removed.
Figure 3:
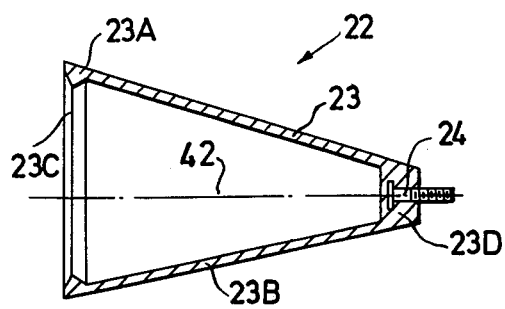
FIG. 3 is a sectional side elevation of a first form of a valve member for a valve according to the invention.

As shown more clearly in FIG. 2 the valve seat 19 is formed with two regions of circular apertures 29 which allow water to flow through the valve seat 19 when the diaphragm 23 of the valve member 22 is deflected inwardly by the pressure of water. Even though the apertures 29 are closely spaced, to provide an adequate flow path for water passing through the valve, the size of the apertures is limited so as to ensure that the diaphragm 23 is adequately supported. In the valve member 22 shown in FIGS. 3 and 4, the diaphragm 23 is of substantially triangular cross-section and in each non-annular cross-section 30, bounded by non-circular inner and outer peripheries 31 and 32, there are three equi-angularly spaced outwardly-convex curved portions 33 and three interconnecting portions 34 with rectilinearly extending inner and outer edges 35 and 36. As shown, the outer surfaces of the outwardly-convex curved portions 33 of the cross-section of the diaphragm 23 at the rim are radially spaced from the axis 42 of the valve member by a distance which is greater than the radius of the inner periphery 19C of the rim 19A of the valve seat 19 so that, on insertion of the valve member into the valve seat, the outwardly-convex curved portions 33 are pressed inwardly and the interconnecting portions 34 deflect outwardly into sealing engagement with the entire internal periphery at the rim 19A of the valve member 19. However, when the positive pressure differential across the valve 10 exceeds a certain level, typically from 1 to 10 psi for diaphragms 23 of different thickness, the interconnecting portions 34 begin to deflect inwardly to form outwardly-concave flow channels for the water, as shown in FIG. 5.

Figure 5:
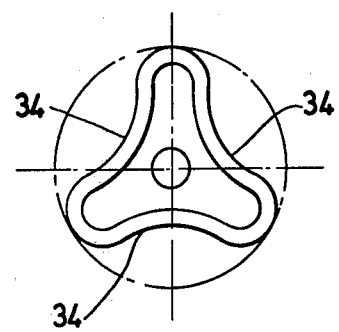

Because of the pre-stressing of the outwardly-convex curved portions 33, on insertion of the valve member 23 into the valve seat 19, the diaphragm 23 will always deflect in the same manner as indicated in FIG. 5 so as to provide a constant flow resistance.

Figure 4:
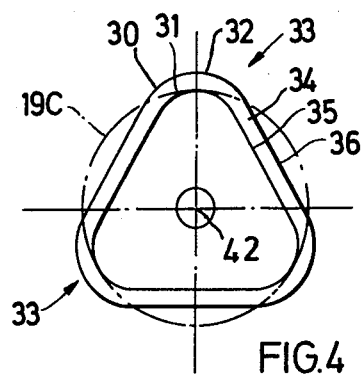
FIGS. 4 and 5 are axial end elevations of the valve member shown in FIG. 3, respectively showing the valve member with a hollow, conoidally-shaped diaphragm forming part of the valve member in its undeformed and deformed conditions.
Figure 6:
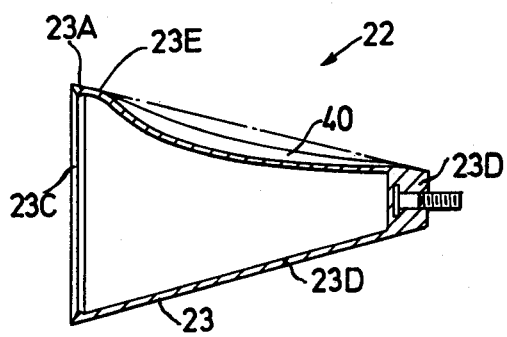
FIG. 6 is a sectional side elevation of a second form of a valve member for a valve according to the invention.
Figure 7:
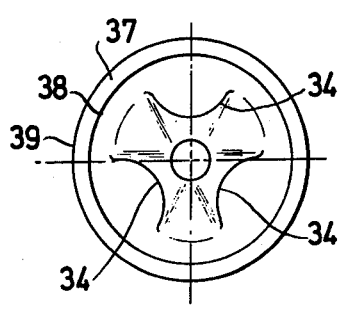
FIGS. 7 and 8 are axial end elevations of the valve member shown in FIG. 6, respectively showing the valve member with a hollow, conoidally-shaped diaphragm forming part of the valve member in its undeformed and deformed conditions.
Figure 8:
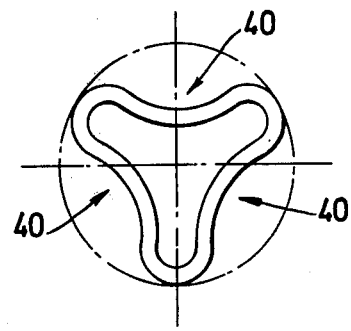

In the valve member 22 shown in FIG. 6, part 23E of the diaphragm 23, extending axially from the rim 23A, has an annular cross-section 37 bounded by circular inner and outer peripheries 38 and 39. However, the diaphragm 23 is moulded so that at cross-sections axially spaced from this part of the diaphragm 23, there are circumferentially-spaced, concave portions 34 defining longitudinal grooves 40 which extend part way along the length of the diaphragm 23. As shown in FIG. 8, when the diaphragm is subjected to a predetermined pressure differential across the valve, the rim 23A of the diaphragm 23 deflects inwardly so as to constitute outwardly-concave extensions of the grooves 40. Here again, the fixed position of the grooves 40 ensures that the rim of the valve diaphragm 23 always deflects in the same manner so as to ensure the valve member responds rapidly to reversal of the pressure gradient. It should also be understood that the portions 34 need not be concave as shown in FIG. 7, but could be planar as shown in FIG. 4.

Although the invention has been described in terms of a water valve, it is to be understood that valves for other liquids and gases can also be constructed utilizing a valve member according to the invention.

I claim:

1. A non-return valve, comprising:
   a housing having inlet and outlet ends and attachment means for attaching the inlet and outlet ends of the housing, respectively, to inlet and discharge pipes;
   a perforate, hollow, conoidally-shaped valve seat defining a cavity of circular cross-section mounted within the housing and having a base, a rim and mounting means at said rim for securing said valve seat in position in said housing; and a valve member comprising a hollow conoidally-shaped diaphragm of elastomerically deformable material having a base, a rim, an inwardly directed bead around the rim and connecting means connecting the base of the diaphragm to the base of the valve seat so that the entire outer periphery of the rim of the diaphragm is in sealing engagement with the inner periphery of the rim of the valve seat, whereas at least part of the remainder of the outer surface of the diaphragm is spaced inwardly of the cavity defined by the valve seat;

the diaphragm having, throughout part of its axial length, a cross-section which, before insertion of the valve member into the valve seat, has a non-annular shape which is bounded by non-circular inner and outer peripheries.

2. A non-return valve, according to claim 1, in which, prior to insertion of the valve member into the valve seat, each non-annular cross-section of the diaphragm has a plurality of peripherally spaced outwardly-convex curved portions and interconnecting portions of different curvature to the outwardly-convex portion.

3. A non-return valve, according to claim 2, in which, prior to insertion of the valve member into the valve seat, the rim of the diaphragm, which is engageable with the inner periphery of the rim of the valve seat, has a non-annular cross-section and the outer surfaces of the outwardly-convex curved portions of the cross-section are radially spaced from the axis of the valve member by a distance which is greater than the radius of the inner periphery of the valve seat.

4. A non-return valve, according to claim 3, in which the inner surface of the valve seat is engaged by part of the outer surface of the diaphragm which, prior to insertion of the valve member into the valve seat, provides the outwardly-convex curved portions of non-annular cross-section of the diaphragm which are axially spaced from the rim of the diaphragm.

5. A non-return valve, according to claim 2, in which the outwardly-convex curved portions have the same curvature as each other and the interconnecting portions have the same curvature as each other.

6. A non-return valve, according to claim 2, in which the interconnecting portions have zero curvature and rectilinearly extending inner and outer edges.

7. A non-return valve, according to claim 1, in which a part of the diaphragm extending axially from the rim of the diaphragm has an annular cross-section bounded by circular inner and outer peripheries.

8. A non-return valve, according to claim 7, in which each non-annular cross-section of the diaphragm has a plurality of peripherally spaced outwardly-convex curved portions and interconnecting portions of different curvature to the outwardly-convex portions.

9. A non-return valve, according to claim 8, in which the outwardly-convex portions have the same curvature as each other and the interconnecting portions have the same curvature as each other.

10. A non-return valve, according to claim 8, in which the interconnecting portions have zero curvature and rectilinearly extending inner and outer edges.

11. A non-return valve, according to claim 8, in which the interconnecting portions constitute outwardly-concave curved portions.

* * * * *